US008219281B2

(12) United States Patent
Boss et al.

(10) Patent No.: US 8,219,281 B2
(45) Date of Patent: Jul. 10, 2012

(54) CONTROLLING VEHICLE OPERATIONS BASED ON OBJECT PRESENCE

(75) Inventors: Gregory J. Boss, Saginaw, MI (US); Peter G. Finn, Brampton, CA (US); Rick A. Hamilton, II, Charlottesville, VA (US); Brian M. O'Connell, Cary, NC (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 12/329,118

(22) Filed: Dec. 5, 2008

(65) Prior Publication Data

US 2010/0145563 A1 Jun. 10, 2010

(51) Int. Cl.
*G06F 7/00* (2006.01)
*G06F 17/00* (2006.01)
*G06F 19/00* (2006.01)

(52) U.S. Cl. ............................. 701/36; 701/63; 180/287

(58) Field of Classification Search .................... 701/36, 701/51, 53, 54, 62, 63, 65, 99, 101, 102, 701/114, 29, 31, 35, 49, 45; 180/232, 287, 180/271, 284, 279, 282, 283; 340/426.16, 340/435, 436, 437, 438, 439, 547, 539.1
See application file for complete search history.

(56) References Cited

U.S. PATENT DOCUMENTS

| | | | | |
|---|---|---|---|---|
| 4,897,630 | A * | 1/1990 | Nykerk | 340/426.25 |
| 6,944,528 | B2 | 9/2005 | Nagano | |
| 6,995,652 | B2 * | 2/2006 | Carrender et al. | 340/5.61 |
| 7,084,767 | B2 * | 8/2006 | Hasegawa et al. | 340/572.1 |
| 7,176,801 | B2 | 2/2007 | Matsukawa et al. | |
| 7,202,776 | B2 * | 4/2007 | Breed | 340/435 |
| 7,236,798 | B2 | 6/2007 | Beuck | |
| 7,408,445 | B1 * | 8/2008 | Cunningham | 340/425.5 |
| 7,737,833 | B2 * | 6/2010 | Takafuji | 340/436 |
| 8,060,282 | B2 * | 11/2011 | Breed | 701/48 |
| 2002/0097146 | A1 * | 7/2002 | Harris, III | 340/435 |
| 2004/0019426 | A1 * | 1/2004 | Knoop et al. | 701/301 |
| 2005/0134440 | A1 * | 6/2005 | Breed | 340/435 |
| 2006/0238316 | A1 * | 10/2006 | Taki et al. | 340/426.13 |
| 2008/0255731 | A1 * | 10/2008 | Mita et al. | 701/45 |
| 2008/0284575 | A1 * | 11/2008 | Breed | 340/438 |
| 2009/0045928 | A1 * | 2/2009 | Rao et al. | 340/435 |
| 2009/0240400 | A1 * | 9/2009 | Lachapelle et al. | 701/45 |
| 2010/0145563 | A1 * | 6/2010 | Boss et al. | 701/29 |
| 2010/0268423 | A1 * | 10/2010 | Breed | 701/45 |

* cited by examiner

*Primary Examiner* — Paul N Dickson
*Assistant Examiner* — Karen A Beck
(74) *Attorney, Agent, or Firm* — Patrick J. Daugherty; Driggs, Hogg, Daugherty & Del Zoppo Co., LPA

(57) ABSTRACT

A system, method, and program product controls an operation of a vehicle based on the presence of one or more foreign objects within one or more monitored zones about the vehicle. One or more transceivers receive information about the one or more foreign objects. Based on the received information and the one or more corresponding zones, one or more controllers identify a response, which may include notifying the user about the foreign object and/or generating a signal that inhibits the ignition from turning on. The system, method, and program product also control an operation of a vehicle based on the absence of an object of the vehicle. Likewise, the one or more controllers identify a response, which may include notifying the user about the missing object and/or generating a signal that inhibits the ignition from turning on.

24 Claims, 2 Drawing Sheets

CONTROLLING VEHICLE OPERATIONS BASED ON OBJECT PRESENCE

FIELD OF THE INVENTION

The present invention generally relates to controlling an operation of a vehicle and, more particularly, to a method, system, and program product that controls an operation of the vehicle based on the presence of a foreign object within a monitored zone about the vehicle and/or absence of an object of the vehicle.

BACKGROUND OF THE INVENTION

During normal operation of a vehicle, such as an automobile, various mechanical structures and electrical circuits are active. The presence of a foreign object (an object that generally should not be present during normal operation of the vehicle) near such structures and/or circuits when the vehicle is being operated may lead to a situation in which the vehicle and/or the object can be damaged. An example includes a multimeter left within the engine. If the multimeter moves into rotating fan blades of an operating vehicle, the multimeter and/or the fan may become damaged, if a lead wire of the multimeter moves up against a terminal of the battery, the lead wire may short the battery, etc. Likewise, absence of an object of the vehicle that should be present during operation of the vehicle may lead to a situation in which the vehicle is damaged. An example includes an oil cap for the oil entry port on the engine. Operating a vehicle without the oil cap may result in loss of oil via the oil entry port and contamination of the oil as a result of debris entering the oil entry port, and operating the vehicle with less than the recommended volume of oil and/or contaminated oil may result in engine damage.

SUMMARY OF THE INVENTION

In one aspect, a system includes a first transceiver that receives first information about a first foreign object in a first zone of the vehicle. The first foreign object is an object that generally is not present when the vehicle is running. The system further includes a first controller that generates a signal that inhibits the vehicle from starting based on the first information about the first foreign object and the first zone.

In another aspect, a method includes receiving information about a foreign object in a zone of the vehicle, identifying the foreign object from the information, identifying a first action corresponding to the foreign object, wherein the first action includes inhibiting the vehicle from starting, and performing the first action.

In another aspect, a method includes producing computer executable program code, storing the code on a computer readable medium, and providing the program code to be deployed and executed on a computer system. The program code comprising instructions which, when executed on the computer system, cause the computer system to: receive information about a foreign object in a zone of the vehicle, identify the foreign object from the information, and identify an action corresponding to the foreign object, wherein the action includes inhibiting the vehicle from starting.

In another aspect, a method for deploying an application for controlling an operation of a vehicle based on the presence and/or absence of an object includes providing a computer infrastructure being operable to: receive information about a foreign object in a zone of the vehicle, identify the foreign object from the information, and identify an action corresponding to the foreign object, wherein the action includes inhibiting the vehicle from starting.

BRIEF DESCRIPTION OF THE DRAWINGS

These and other features of this invention will be more readily understood from the following detailed description of the various aspects of the invention taken in conjunction with the accompanying drawings in which.

Figure 1:
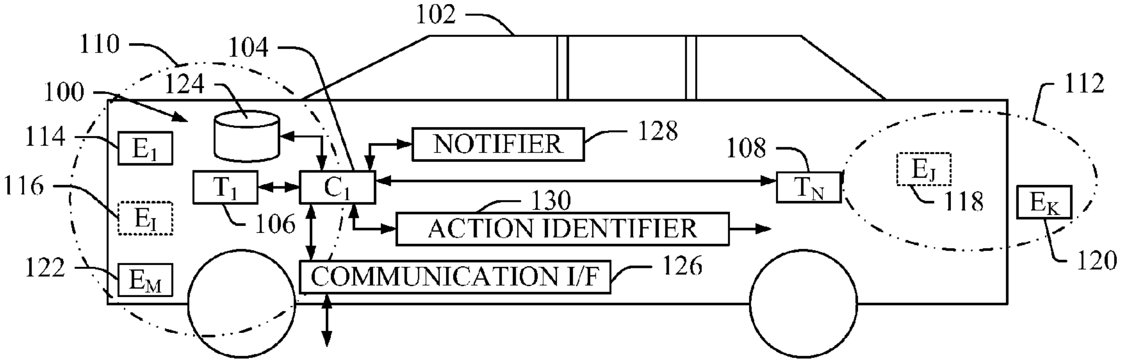
FIG. 1 illustrates a system of a vehicle with a controller that controls an operation of the vehicle based on information received by one or more transceivers from one or more emitters of the vehicle.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections I. General Description II. Computerized Implementation I. General Description FIG. 1 illustrates a non-limiting example in which a system 100 facilitates controlling an operation of a vehicle such as an automobile 102 based on the presence of a foreign object and/or the absence of an object of the vehicle. The system 100 includes a controller ($C_1$) 104 such as a computer, a control module, a microprocessor, or the like. The controller $C_1$ 104 communicates with various components including, but not limited to, other controllers, computers, control modules, microprocessors, systems, subsystems, etc. of the vehicle. For example, the system 100 may be part of, include, or work in conjunction with a main computing system or computer of the vehicle.

The system 100 includes N transceivers, wherein N is a positive integer equal to or greater than one. For clarity and sake of brevity, only two of the transceivers, $T_1$ 106 and $T_N$ 108, are shown. The transceivers $T_1$ 106 and $T_N$ 108 respectively receive information that traverses respective zones 110 and 112. In this example, the zone 110 is generally spherical in shape and the zone 112 is generally spheroidal in shape. However, other shapes are also contemplated herein. For instance, a suitable zone may have an ellipsoid, a paraboloid, a hyperboloid, a conical, an irregular, and/or other shape.

The size of the zones 110 and 112 are configurable so that each zone can be used to receive information within a particular region. In the illustrated example, the zone 110 encompasses a first region that generally corresponds to the region in which the engine resides. The zone 112 encompasses a second region that generally corresponds to the region in which a fuel entry port to the fuel tank resides. The second region covers an area within the perimeter of the vehicle as well as an area outside of the perimeter of the vehicle. The information can be used to locate a foreign object within a particular zone based on the zone. For instance, receiving information by the transceivers T1 106 indicates that the information came from the region in which the engine resides. In another implementation, such zones overlap.

The transceivers $T_1$ 106 and $T_N$ 108 include various wireless technology. For explanatory purpose and sake of brevity, the example illustrated in FIG. 1 is described in relation to RFID technology. The transceivers $T_1$ 106 and $T_N$ 108 receive information from M emitters $E_1$ 114, . . . $E_I$ 116, $E_J$ 118, $E_K$ 120, . . . , $E_M$ 122, wherein M is an integer equal to or greater then one. The particular type of emitters $E_1$ 114, . . . $E_I$ 116, $E_J$ 118, $E_K$ 120, . . . , $E_M$ 122 employed depends on the type of transceiver employed. In this example, the emitters $E_1$ 114, . . . $E_I$ 116, $E_J$ 118, $E_K$ 120, . . . , $E_M$ 122 include RFID tags that emit information. One or more of the tags may be active, passive, or semi-active RFID tags that emit various information such as the nature and/or one or more characteristics about an object to which each tag is affixed.

The system 100 further includes a storage component 124 such as a memory, a database, etc. that stores information related to an object(s) that should not be and/or an object(s) that should be located with the vehicle during operation of the vehicle. The storage component 124 also stores rules or the like that facilitate identifying one or more responses depending on whether a foreign object is present or an object of the vehicle is absent. The rules stored in the storage component 124 may be modified and/or deleted via a communication interface (I/F) 126 used to communicate with a device external to the vehicle such as a network, a computer, a client, etc. In addition, new rules may be added to the storage component 124 via the communication I/F 126.

An example of a suitable response is a notification. A notifier 128 is used provide notifications. Such notifications may be audible, visual, tactile, etc. For instance, a notification may include displaying an alphanumeric message on a display screen, selectively and variously illuminating lights such as light emitting diodes (LEDs) or other lights, etc. Alternatively or additionally, a speaker or the like may be used to produce a beep, a bell, a song, a human discernable messages, etc. Alternatively or additionally, a transducer may be used to convert a signal into mechanical movement such as, but not limited to, a vibration. The notifier 128 may also communicate the notification to a system external to the vehicle. For instance, the notification may be sent to a cell phone, an email address, a pager, a printer, etc.

Another example of a suitable response is a signal indicative of an action to perform or a signal that invokes the action to be performed. An action identifier 130 conveys such signals. In one instance, the signal may indicate that the vehicle's ignition should remain in or transition to an off state. Such a signal may be conveyed to the ignition control system and/or other component that controls the ignition. As such, the recipient component of the signal may turn the vehicle off or ignore the signal based on the signal and/or other information. In another instance, the signal causes the ignition to turn off.

The following provides a non-limiting example of the system 100 in operation. In this example, the emitter $E_1$ 114 is affixed to a socket wrench left with the engine. The wrench is considered a foreign object since it should not be with the engine when the vehicle is being operated. The emitter $E_I$ 116 is affixed to an air filter. The air filter is absent from the vehicle in this example, as indicated via the dotted lines. As such, emitter $E_I$ 116 represents an object of the vehicle that should be in the vehicle when the vehicle is being operated. Without the air filter, debris that would otherwise be filtered passes through and may increase the likelihood of damage and a subsequent repair.

The emitter $E_J$ 118 is affixed to the fuel cap, which also represents an object of the vehicle that should be with the vehicle when the vehicle is being operated but is absent, as indicated via the dotted lines. With the fuel door closed, debris may still be prevented from entering the fuel tank; however, fuel emissions may more easily escape into the environment. The emitter $E_J$ is affixed to or part of a device external to the vehicle such as a cell phone, an electronic gamming system, a lighter, etc. The emitter $E_M$ is affixed to a tire iron left with the engine. Like emitter $E_1$ 114, the tire iron is considered a foreign object since it should not be with the engine when the vehicle is being operated.

The emitter $E_1$ 114, when subjected to an electromagnetic or other field produced by the transceiver $T_1$ 106 or on its own, emits information related to the socket wrench to which it is affixed. Such information may include information about the nature of the socket wrench as indicia that identifies it as a socket wrench. Additionally or alternatively, the information may include information regarding the size of the socket wrench, the shape of the socket wrench, how the socket wrench is used with the vehicle, whether the socket wrench is a type of object that securely attaches to the vehicle, the durability of the socket wrench, etc. Such information is provided to the controller $C_1$ 104 along with socket wrench location information, which may be obtained from the emitter $E_1$ 114 and/or the transceiver $T_1$ 106.

The controller $C_1$ 104 accesses the storage component 124 for the information about the nature and/or a characteristic of the socket wrench and/or one or more related rules. For instance, where the information identifies the socket wrench as a socket wrench, the controller $C_1$ 104 may map the socket wrench to a response to a socket wrench being located in the engine in a look up table or the like in the storage component 124. Where a characteristic about the socket wrench is additionally or alternatively provided, the controller $C_1$ 104 may map the characteristics to a response to such characteristic in the engine in a look up table or the like in the storage component 124. When both the nature and a characteristic are available, the results from using both may be compared to verify the response is suitable, to provide a primary and a backup response, to offer a choice of two suitable responses, etc. Where neither the type nor the characteristic is in the storage component 124, the controller $C_1$ 104 may use a classifier, an inference engine, a history of responses, and/or the like to facilitate determining an appropriate response.

In one instance, the response may be to have the notifier 128 provide a message that indicates that a socket wrench is within the zone covering the engine. The message may include the identity of the socket wrench. For example, the display and/or speaker may provide a message stating that a socket wrench is within the engine region. In another instance, the message may indicate that a foreign object is located with the engine and that it is likely to be lost or damaged if not removed or secured before the vehicle is operated and/or that the vehicle is likely to be damaged if the foreign object is not removed before the vehicle is operated.

Additionally or alternatively, the response may be to have the action identifier 130 provide a signal that indicates that the vehicle should not be started without removing the foreign object or a signal that inhibits the vehicle from being started.

The signal may be directly or indirectly provided to the ignition control system and/or main computing system of the vehicle. A message indicating such action has occurred may also be presented by the notifier 128.

The transceiver $T_1$ 106 receives similar information from the emitter $E_M$, which, as indicated above, is affixed to a tire iron, which is a foreign object. Since a tire iron is not likely to be substantially damaged if it falls to the ground, the message may indicate that the foreign object or the tire iron is located with the engine and is likely to be lost or cause damage to the vehicle. As with the socket wrench, the response may be to have the action identifier 130 provide a signal that indicates that the vehicle should not be started without removing the object or a signal that inhibits the vehicle from being started.

Upon reading information from emitters present within the reading zones 110 and 112, the controller $C_1$ 104 may also access the storage component 124 to determine whether a component that should be in one of the zones is located in one of the zones. In this example, the emitter $E_I$, which is affixed to the air filter, should be present but is not. As such, the controller $C_1$ 104 does not receive information about the air filter, and the controller $C_1$ 104 identifies the air filter as a missing component.

In this case, the response may be to have the notifier 128 provide a message that indicates that the air filter is absent using the display, the speaker, etc. The message may also indicate that running the vehicle without the air filter may result in detrimental affects that would otherwise not happen if the air filter were present. Additionally or alternatively, the action may be to have the action identifier 130 provide a signal that indicates that the vehicle should not be started without the air filter or signal that inhibits the vehicle from being started.

The controller $C_1$ 104 also identifies the missing fuel cap as an object of the vehicle that is not located within the zone 112. In this case, the response may be to have the notifier 128 provide a message that indicates that the fuel cap is absent using the display, the speaker, etc. The message may also indicate that as a result fuel emissions greater than that which would be emitted if the cap were installed are likely to be emitted. Since, generally, with the fuel door closed, debris should still be blocked from entering the fuel tank, a signal that indicates that the vehicle should not be started or that inhibits the vehicle from being started may not be generated and sent.

The information from emitter $E_K$ regarding the cell phone, in this example, alone does not present a situation in which the vehicle or the cell phone can be damaged. As such, the information may be stored or discarded, acted upon or ignored, etc. For instance, a response may be to do nothing. In addition, the information may be stored and used in conjunction with other stored information to determine responses as described below. For example, the information related to the missing fuel cap and the cell phone may be used in conjunction to identify a situation that warrants a response such as a notification and/or inhibiting an operation of the vehicle. For instance, as known, an operating cell phone has been known to generate a spark or the like that may cause inadvertent combustion of fuel. As such, controller $C_1$ 104 may derive from the stored information and/or the rules that a potentially dangerous situation exists. As such, the notifier 128 may provide a corresponding message and/or signal as described above.

It is to be appreciated that a particular situation may be ranked according to the potential outcome of not changing the situation. For instance, in the example provided above, the combination of the missing fuel cap and the operating cell phone may be ranked high since such a situation may result in inadvertent fuel combustion. The missing air filter may be ranked lower since the damage, if any, is likely to be relatively less. The socket wrench may be ranked next since damage could occur to both the vehicle and the socket wrench. The tire iron may be ranked next since damage is likely to occur to the vehicle, but not the tire iron. The missing gas cap may be ranked next since damage to the vehicle and the gas cap is likely not to occur. The operating cell phone may be ranked last since it is external to the vehicle and alone does not present any problems for the vehicle or the cell phone. Of course, the above scenarios and rankings are for explanatory purposes and do not limit the contemplated embodiments.

It is also to be appreciated that the information in the storage component 124 may be communicated over the communication interface 126. As such, the information may be analyzed and/or an response resulting therefrom may be identified external to the vehicle by a component external to the vehicle. The results of such an analysis and/or the identified response can be communicated back to system 100 via the communication interface 126. It is to be appreciated that such communication may be via a personal area network, over the Internet, or the like. In addition, the information obtained from the emitters may be included in and/or form part of a history.

Although the above described the system 100 as detecting foreign objects and missing objects, it is to be understood that that in another implementation system 100 either may not detect the absence of objects of the vehicle or may not detect the presence of a foreign object. In addition, the user may override the system 100. Thus, the user may start the vehicle after the system inhibits the vehicle from starting. For example, the user may enter authorization indicia (e.g., a code, a fingerprint, an iris scan, a password, etc.) that allows the user to override the system 100.

Figure 2:
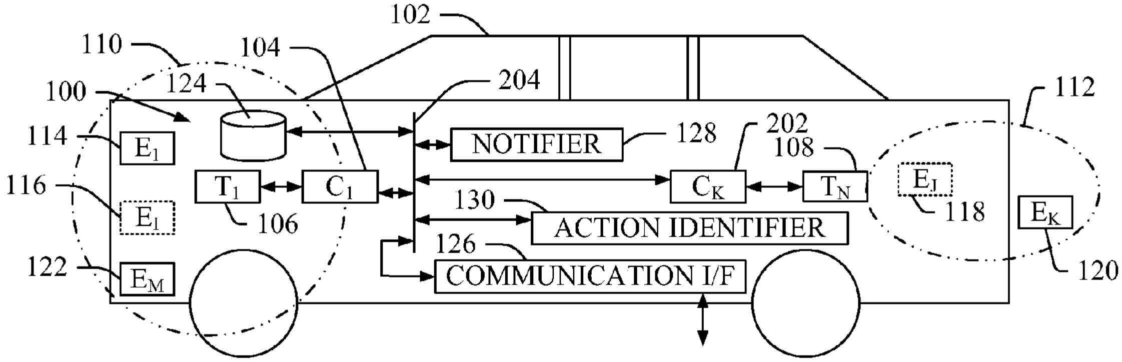
FIG. 2 illustrates a system of a vehicle with multiple controllers that control an operation of the vehicle based on information received by one or more transceivers from one or more emitters of the vehicle.

FIG. 2 illustrates an example in which more than one controller is employed. In this example, the controller $C_1$ 104 receives information from the emitters $E_1$ 114, $E_I$ 116, and $E_M$ 122 as described above. A second controller $C_K$ 202 receives information from the emitters $E_J$ 118 and $E_K$ 120. It is to be appreciated that the second controller $C_2$ 202 operates as described herein with respect to the controller $C_1$ 104. In addition, more than two controllers may be used in other implementations. Furthermore, zones 112 and 110 may partially overlap, one of the zones may encompass the entirety of the other zone, one of the zones may be omitted, etc. Moreover, the controllers $C_1$ 104 and $C_2$ 202 may communicate with each other and/or the storage component 124, the communication I/F 126, the notifier 128, and/or the action identifier 130 via a bus 204 (as shown), via a wireless network, a common backplane, a router, etc.

Figure 3:
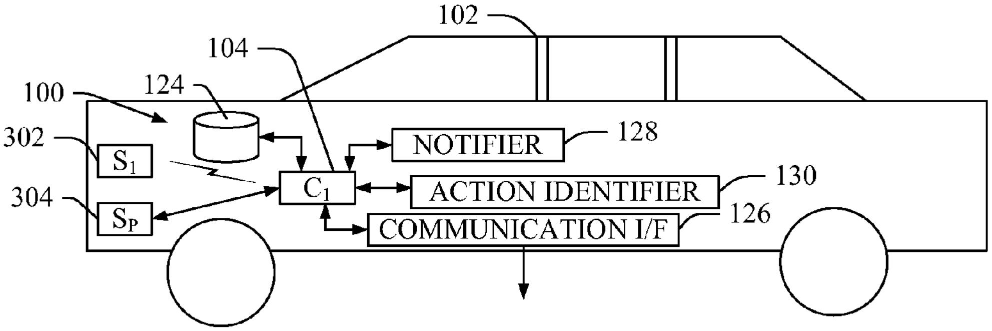
FIG. 3 illustrates a system of a vehicle with a controller that controls an operation of the vehicle based on information received from one or more sensors of the vehicle.

FIG. 3 illustrates an example in which P sensors, wherein P is an integer equal to or greater than one, communicate such information with the controller $C_1$ 104. For sake of brevity and clarity, sensors $S_1$ 302 and $S_P$ 304 are illustrated. The sensors $S_1$ 302 and $S_P$ 304 sense a state, the nature, and/or a characteristic of a foreign object and/or an object of the vehicle and provide such information to the controller $C_1$ 104. The sensors $S_1$ 302 and $S_P$ 304 may send the information upon receiving it, periodically send such information, send such information upon a request from the controller $C_1$ 104, etc. In addition, the controller $C_1$ 104 may periodically poll, read, etc. such information. As shown, in this example, communication between the controller $C_1$ 104 and the sensors $S_1$ 302 and $S_P$ 304 may be through wired ($S_P$ 304) and/or wireless ($S_1$ 302) communications. It is also to be appreciated that one or more of the storage component 124, the communication I/F 126, the notifier 128, and the action identifier 130 may be omitted.

Figure 4:
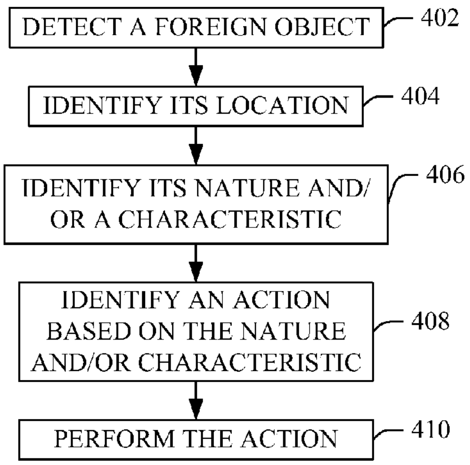
FIG. 4 illustrates a method that controls an operation of a vehicle based on the presence of a foreign object within the vehicle.
Figure 5:
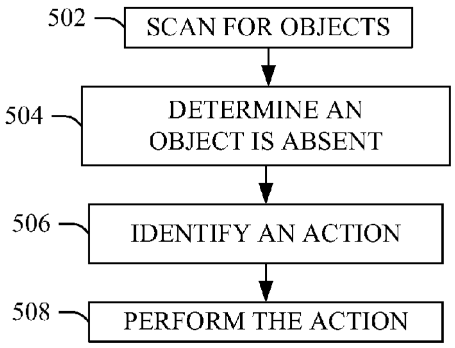
FIG. 5 illustrates a method that controls an operation of a vehicle based on the absence of an object of the vehicle.

FIGS. 4 and 5 illustrate non-limiting example methods. It is to be appreciated that not all of the described acts are required, the acts may be employed in a different order, one or more additional acts may be included, etc. With respect to FIG. 4, at 402 a foreign object is detected within a monitored region of a vehicle. As described above, one or more transceivers such as an RFID reader may be used to scan and/or read one or more zones of and proximate to a vehicle. In addition, the foreign object may include an electronic tag or the like that provides information about the object such as the nature and/or a characteristic of the object. When the object enters a monitored zone, the information can be obtained by a transceiver and/or a controller.

At 404, the region in which the object is located is identified. For instance, the obtained information may include regional information. For example, the information provided for a fuel cap may indicate that it is a fuel cap, and the region of the fuel entry port to the fuel tank may be known to the vehicle. In another instance, since the fuel cap generally is always in the same location when installed on the fuel entry port, the identity of the fuel cap connotes the region. In yet another example, the identity of the transceiver identifies the location of the foreign object based on the region covered by the transceiver.

At 406, the information from the object is used to identify the nature of the object and/or a characteristic of the object. For instance, the information may indicate the type of the object (e.g., wrench) and/or whether the object may cause sparks. At 408, based on the nature and/or characteristic, a response is identified. As noted above, this may include mapping the nature and/or characteristic to a look up table, deriving a response based on the nature and/or characteristic of several present and/or absent objects, etc. At 410, a corresponding action is performed. As noted above, the response may include providing a notification, a signal that indicates an action to perform, a signal that invokes an action, a null action, etc.

With respect to FIG. 5, at 502 a scan is performed for one or more objects in a vehicle. As described above, one or more transceivers may be used to monitor one or more zones of and proximate to a vehicle. In addition, an object used with the vehicle may include an electronic tag such as an RFID tag or the like that provides information about the object such as the nature and/or a characteristic of the object. When the object enters a monitored zone and/or when an object in a monitored zone is subjected to an electromagnetic field, the information can be obtained by a transceiver.

At 504, the information about the object(s) is compared with information about monitored objects that should be present in the vehicle to determine if an object that should be present is absent. At 506, based on the nature and/or characteristic of the object, an action is identified. As noted above, this may include mapping the nature and/or characteristic to a look up table, deriving an action based on the nature and/or characteristic of several present and/or absent objects, etc. At 508, a corresponding action is performed. As noted above, the response may include providing a notification, a signal that indicates an action to perform, a signal that invokes an action, a null action, etc.

Another method includes receiving information about a foreign object in a zone about a vehicle, identifying the foreign object from the information, identifying a first action corresponding to the foreign object, wherein the first action includes inhibiting the vehicle from starting, and performing the first action. This method may also include receiving information about the absence of an object of the vehicle, identifying the object from the information, identifying a second action corresponding to the object, wherein the second action includes inhibiting the vehicle from starting, and performing the second action. This method may also include notifying a user of a possible consequence to the vehicle if the vehicle is started without the object.

This method may also include identifying a characteristic of the foreign object from the information, identifying a second action corresponding to the characteristic, wherein the second action includes inhibiting the vehicle from starting, and performing the second action. In one instance, the first action is identified in a computing system of the vehicle. In another instance, the first action is identified in a computing system external to the vehicle. This method may also include notifying a user of a possible consequence to the vehicle if the vehicle is started without removing the foreign object. This method may also include providing the first action to an ignition control system of the vehicle.

Another method includes producing computer executable program code, storing the code on a computer readable medium, and providing the program code to be deployed and executed on a computer system, the program code comprising instructions which, when executed on the computer system, cause the computer system to: receive information about a foreign object in a zone of the vehicle, identify the foreign object from the information, and identify an action corresponding to the foreign object, wherein the action includes inhibiting the vehicle from starting.

Another method includes deploying an application for controlling an operation of a vehicle based on presence and/or absence of an object, comprising: providing a computer infrastructure being operable to: receive information about a foreign object in a zone of the vehicle, identify the foreign object from the information, and identify an action corresponding to the foreign object, wherein the action includes inhibiting the vehicle from starting.

II. Computerized Implementation

Figure 6:
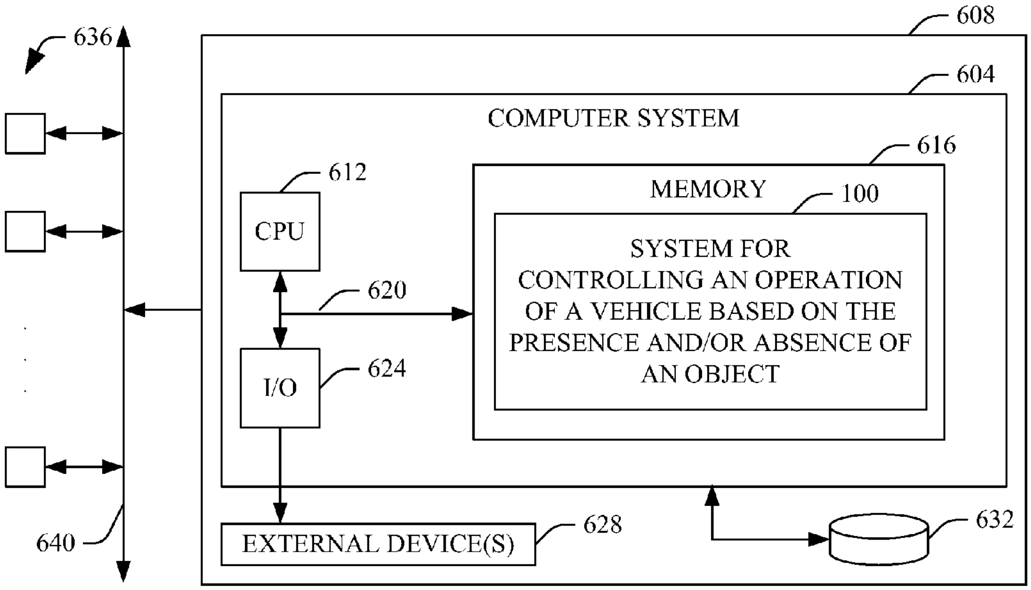
FIG. 6 illustrates an exemplary computerized implementation of the systems and methods.

Referring now to FIG. 6, an exemplary computerized implementation includes a computer system 604 deployed within a computer infrastructure 608 such as one existing with the vehicle 102 described above. This is intended to demonstrate, among other things, that the present invention could be implemented within a network environment (e.g., the Internet, a wide area network (WAN), a local area network (LAN), a virtual private network (VPN), etc.), or on a stand-alone computer system.

In the case of the former, communication throughout the network can occur via any combination of various types of communication links. For example, the communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, computer infrastructure 608 is intended to demonstrate that some or all of the components of implementation could be deployed, managed, serviced, etc. by a service provider who offers to implement, deploy, and/or perform the functions of the present invention for others.

As shown, the computer system 604 includes a processing unit 612, a memory 616, a bus 620, and input/output (I/O) interfaces 624. Further, the computer system 604 is shown in communication with external I/O devices/resources 628 and storage system 632. In general, the processing unit 612 executes computer program code, such as the code to implement various components of the system 100, which is stored in memory 616 and/or storage system 632. It is to be appreciated that two or more, including all, of these components may be implemented as a single component.

While executing computer program code, the processing unit 612 can read and/or write data to/from the memory 616, the storage system 632, and/or the I/O interfaces 624. The bus 620 provides a communication link between each of the components in computer system 604. The external devices 628 can comprise any devices (e.g., keyboard, pointing device, display, etc.) that enable a user to interact with computer system 604 and/or any devices (e.g., network card, modem, etc.) that enable computer system 604 to communicate with one or more other computing devices.

The computer infrastructure 608 is only illustrative of various types of computer infrastructures for implementing the invention. For example, in one embodiment, computer infrastructure 608 comprises two or more computing devices (e.g., a server cluster) that communicate over a network to perform the various process steps of the invention. Moreover, computer system 604 is only representative of various possible computer systems that can include numerous combinations of hardware.

To this extent, in other embodiments, computer system 604 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively.

Moreover, the processing unit 612 may comprise a single processing unit, or be distributed across one or more processing units in one or more locations, e.g., on a client and server. Similarly, the memory 616 and/or the storage system 632 can comprise any combination of various types of data storage and/or transmission media that reside at one or more physical locations.

Further, I/O interfaces 624 can comprise any system for exchanging information with one or more of the external device 628. Still further, it is understood that one or more additional components (e.g., system software, math co-processing unit, etc.) not shown in FIG. 6 can be included in computer system 604. However, if computer system 604 comprises a handheld device or the like, it is understood that one or more of the external devices 628 (e.g., a display) and/or the storage system 632 could be contained within computer system 604, not externally as shown.

The storage system 632 can be any type of system (e.g., a database) capable of providing storage for information under the present invention. To this extent, the storage system 632 could include one or more storage devices, such as a magnetic disk drive or an optical disk drive. In another embodiment, the storage system 632 includes data distributed across, for example, a local area network (LAN), wide area network (WAN) or a storage area network (SAN) (not shown). In addition, although not shown, additional components, such as cache memory, communication systems, system software, etc., may be incorporated into computer system 604.

Shown in the memory 616 of computer system 604 is the system 100, which includes the components and performs the functions discussed above. In the illustrated embodiment, the system 100 communicates with external entities 636 such as another vehicle computing system, a system that identifies an action to perform based on the object, a system for modifying the contents of the storage component 124, other apparatuses external to the vehicle, etc. over a path 440, which may be wired (as shown) or wireless.

While shown and described herein as a method and a system, it is understood that the invention further provides various alternative embodiments. For example, in one embodiment, the invention provides a computer-readable/useable medium that includes computer program code to enable a computer infrastructure to perform the process steps of the invention. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 616 (FIG. 6) and/or the storage system 632 (FIG. 6) (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to manage the system 100. In this case, the service provider can create, maintain, support, etc., a computer infrastructure, such as the computer infrastructure 608 (FIG. 6) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the system 100. In this case, a computer infrastructure, such as computer infrastructure 608 (FIG. 6), can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 604 (FIG. 6), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" of a plurality of elements, a "primary" distinguished from a "secondary," an "another", etc.). Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system, comprising:

a first transceiver that wirelessly scans and receives first information emitted wirelessly by a first object within a first scanning zone area, wherein the emitted first information identifies the first object, and the first scanning zone area corresponds to an identified region within or about a vehicle;

a storage component that stores rules that specify actions to perform as a function of an absence or a presence of certain identified objects within the identified vehicle region; and a controller in communication with the first transceiver and the storage component that generates a signal that inhibits the vehicle from starting if the first transceiver wirelessly scans the first zone and receives the first information emitted wirelessly from within the first zone and the storage component rules indicate that objects having the first object identity should not be present in the identified vehicle region when the vehicle is running, wherein the first object information includes a characteristic of the first object to generate a spark, and wherein the storage component rules recognize that the identified vehicle region comprises combustive fuel.

2. The system of claim 1, wherein the first transceiver further wirelessly scans and receives second information that identifies a second object and is emitted wirelessly by the second foreign object within the first zone, and the controller generates the inhibit signal if the first transceiver wirelessly scans the first zone and does not receive the second information emitted wirelessly from within the first zone and the storage component rules indicate that an object having the second object identity must be present in the identified vehicle region when the vehicle is running.

3. The system of claim 1, wherein the controller further generates a message to a user of the vehicle that identifies the first object as a foreign object located within the identified vehicle region, and that the vehicle is likely to be damaged if the identified foreign object is not removed from or secured within the identified vehicle region before the vehicle is operated.

4. The system of claim 2, further including a plurality of transceivers covering different zones of the vehicle, wherein each transceiver is configured to receive the first and second information about objects in corresponding zones and the first controller is configured to generate the inhibit signal based on the received first and second information and the zone corresponding to one or more of the transceivers.

5. The system of claim 4, further including a plurality of controllers configured to respectively receive the first and second information from a corresponding one of the plurality of the transceivers, wherein each of the plurality of controllers is configured to generate a signal that inhibits the vehicle from starting based on the received first and second information and the zone.

6. The system of claim 2, wherein the controller further ranks a potential outcome of not changing a situation indicated by the first transceiver receiving the first information or not receiving the second object information emitted wirelessly from within the first zone in view of the storage component rules as a function of considering a relative likelihood of harm occurring by not changing the situation.

7. The system of claim 1, wherein the action includes generating a signal that indicates that the vehicle should be inhibited from starting.

8. The system of claim 1, wherein the action includes generating a signal that automatically inhibits the vehicle from starting.

9. The system of claim 1, further comprising a notifier that at least one of visually or audibly presents the identity of the first object to a user of the vehicle.

10. The system of claim 1, wherein the vehicle is an automobile and the system is part of a sub-system of the automobile.

11. The system of claim 1, further comprising a notifier that notifies a user of the vehicle of a possible consequence to the vehicle if the vehicle is started without removing the first object from the vehicle region corresponding to the first zone.

12. The system of claim 1, wherein the first transceiver is a radio frequency identification reader configured to read information emitted by a radio frequency identification tag affixed to the first object, and the radio frequency identification tag emits the first information about the first object.

13. A method for integrating computing infrastructure to control operation of a vehicle based on a presence or absence of an object, the method comprising:

integrating computer-readable program code into a computer system comprising a processing unit, a computer readable memory and a computer readable tangible storage device, wherein the computer readable program code is embodied on the computer readable tangible storage device and comprises instructions that, when executed by the processing unit via the computer readable memory, cause the processing unit to generate a signal that inhibits a vehicle from starting if a first transceiver wirelessly scans a first scanning zone area corresponding to an identified region within or about a vehicle and receives first information emitted wirelessly from a first object within the first zone that identifies the first object and includes a characteristic of the first object to generate a spark, and rules stored in a storage component in communication with the processing unit recognize that the identified vehicle region comprises combustive fuel and indicate that objects having the first object identity should not be present in the identified vehicle region when the vehicle is running.

14. The method of claim 13, wherein the computer readable program code instructions, when executed by the computer processing unit, further cause the computer processing unit to generate the inhibit signal in response to an absence of second object emitted information relative to the first zone as a function of the storage component rules, wherein the first transceiver wirelessly scans and receives the second information that identifies a second object and is emitted wirelessly by the second foreign object within the first zone and the storage component rules indicate that an object having the second object identity must be present in the identified vehicle region when the vehicle is running.

15. The method of claim 13, wherein the computer readable program code instructions, when executed by the computer processing unit, further cause the computer processing unit to generate a message to a user of the vehicle that identifies the first object as a foreign object located within the identified vehicle region, and that the vehicle is likely to be damaged if the identified foreign object is not removed from or secured within the identified vehicle region before the vehicle is operated, if the first transceiver wirelessly scans the first zone and receives the first information emitted wirelessly from within the first zone.

16. The method of claim 13, wherein the computer readable program code instructions, when executed by the computer processing unit, further cause the computer processing unit to rank a potential outcome of not changing a situation indicated by the first transceiver receiving the first object information or not receiving the second object information emitted wirelessly from within the first zone in view of the storage component rules as a function of considering a relative likelihood of harm occurring by not changing the situation.

17. An article of manufacture, comprising:

a computer readable tangible storage device having computer readable program code embodied therewith, the computer readable program code comprising instructions that, when executed by a computer processing unit, cause the computer processing unit to generate a signal that inhibits a vehicle from starting if a first transceiver wirelessly scans a first scanning zone area corresponding to an identified region within or about a vehicle and receives first information emitted wirelessly from a first object within the first zone that identifies the first object and includes a characteristic of the first object to generate a spark, and rules stored in a storage component in communication with the processing unit recognize that the identified vehicle region comprises combustive fuel and indicate that objects having the first object identity should not be present in the identified vehicle region when the vehicle is running.

18. The article of manufacture of claim 17, wherein the computer readable program code instructions, when executed by the computer processing unit, further cause the computer processing unit to generate the inhibit signal in response to an absence of a second object emitted information relative to the first zone as a function of the storage component rules, wherein the first transceiver wirelessly scans and receives the second information that identifies a second object and is emitted wirelessly by the second foreign object within the first zone and the storage component rules indicate that an object having the second object identity must be present in the identified vehicle region when the vehicle is running.

19. The article of manufacture of claim 17, wherein the computer readable program code instructions, when executed by the computer processing unit, further cause the computer processing unit to generate a message to a user of the vehicle that identifies the first object as a foreign object located within the identified vehicle region, and that the vehicle is likely to be damaged if the identified foreign object is not removed from or secured within the identified vehicle region before the vehicle is operated, if the first transceiver wirelessly scans the first zone and receives the first information emitted wirelessly from within the first zone.

20. The article of manufacture of claim 17, wherein the computer readable program code instructions, when executed by the computer processing unit, further cause the computer processing unit to rank a potential outcome of not changing a situation indicated by the first transceiver receiving the first object information emitted wirelessly from within the first zone in view of the storage component rules as a function of considering a relative likelihood of harm occurring by not changing the situation.

21. A method for controlling operation of a vehicle based on a presence or absence of an object, the method comprising:

wirelessly scanning via a first transceiver and receiving first information emitted wirelessly by a first object within a first scanning zone area, wherein the emitted first information identifies the first object and includes a characteristic of the first object to generate a spark, and the first scanning zone area corresponds to an identified region within or about a vehicle; and generating a signal that inhibits the vehicle from starting as a function of a set of rules stored in a storage component that recognize that the identified vehicle region comprises combustive fuel and specify actions to perform as a function of a presence of certain identified objects within the identified vehicle region, if the first transceiver wirelessly scans the first zone and receives the first information emitted wirelessly from within the first zone and the storage component rules indicate that objects having the first object identity should not be present in the identified vehicle region when the vehicle is running.

22. The method of claim 21, further comprising:

generating the inhibit signal in response to an absence of second object emitted information relative to the first zone as a function of the storage component rules, wherein the first transceiver wirelessly scans and receives the second information that identifies a second object and is emitted wirelessly by the second foreign object within the first zone and the storage component rules indicate that an object having the second object identity must be present in the identified vehicle region when the vehicle is running.

23. The method of claim 21, further comprising:

generating a message to a user of the vehicle that identifies the first object as a foreign object located within the identified vehicle region, and that the vehicle is likely to be damaged if the identified foreign object is not removed from or secured within the identified vehicle region before the vehicle is operated, if the first transceiver wirelessly scans the first zone and receives the first information emitted wirelessly from within the first zone.

24. The method of claim 21, further comprising:

ranking a potential outcome of not changing a situation indicated by the first transceiver receiving the first object information emitted wirelessly from within the first zone in view of the storage component rules as a function of considering a relative likelihood of harm occurring by not changing the situation.

* * * * *